US006886015B2

United States Patent
Notargiacomo et al.

(10) Patent No.: US 6,886,015 B2
(45) Date of Patent: Apr. 26, 2005

(54) METHOD AND SYSTEM FOR BUILDING A FAMILY TREE (75) Inventors: Richard C. Notargiacomo, Penfield, NY (US); David L. Patton, Webster, NY (US); Frank Pincelli, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 329 days.

(21) Appl. No.: 09/898,368

(22) Filed: Jul. 3, 2001

(65) Prior Publication Data

US 2003/0014422 A1 Jan. 16, 2003

(51) Int. Cl.[7] .............................................. G06F 7/00
(52) U.S. Cl. ..................... 707/102; 707/100; 707/101; 707/104.1; 707/3; 707/1; 705/27
(58) Field of Search ........................... 707/2, 101, 100, 707/104.1, 102, 3, 1; 705/27

(56) References Cited

U.S. PATENT DOCUMENTS

| 5,557,786 A | * | 9/1996 | Johnson, Jr. | 707/1 |
| 5,754,850 A | * | 5/1998 | Janssen | 707/104.1 |
| 5,819,263 A | * | 10/1998 | Bromley et al. | 707/3 |
| 5,950,193 A | | 9/1999 | Kulkarni | |
| 6,240,421 B1 | * | 5/2001 | Stolarz | 707/102 |
| 6,460,028 B1 | * | 10/2002 | Penoyer | 707/2 |
| 6,618,727 B1 | * | 9/2003 | Wheeler et al. | 707/10 |
| 6,625,581 B1 | * | 9/2003 | Perkowski | 705/27 |
| 2001/0051946 A1 | * | 12/2001 | Nishikawa | 707/100 |
| 2002/0032687 A1 | * | 3/2002 | Huff | 707/104.1 |
| 2002/0112230 A1 | * | 8/2002 | Scott | 717/169 |

OTHER PUBLICATIONS

Genealogy.com; Discover Your Family's Story . . . in 3 Easy Steps; Copyright 1996–2001.
Ancestry.Com; MyFamily.com; Copyright 1998–2001.
Funeral Arrangements by Bartolomeo & Perotto, Rochester, NY.

* cited by examiner

Primary Examiner—Luke S Wassum
Assistant Examiner—Kuen S. Lu
(74) Attorney, Agent, or Firm—Frank Pincelli (57) ABSTRACT A method, system and computer software product for gathering information relevant to the creation of a family tree. Searching of multiple databases is done through a communication network for obtaining relevant information and assessing the probability that the newly identified individual is related to the original individual.

27 Claims, 7 Drawing Sheets

FAMILY TREE WEB-EXPRESS
AUTOMATIC FAMILY TREE AUTHOR

140

INDIVIDUAL
FIRST NAME    MIDDLE NAME OR INITIAL    LAST NAME    GENDER
                                                     O F  O M

DATE OF BIRTH    PLACE OF BIRTH    DATE OF DEATH, IF DECEASED    PLACE OF DEATH, IF DECEASED

RELATIVES OF THE INDIVIDUAL
FIRST NAME    MIDDLE NAME OR INITIAL    LAST NAME    RELATIONSHIP    GENDER
                                                                    O F  O M

DATE OF BIRTH    PLACE OF BIRTH    DATE OF DEATH, IF DECEASED    PLACE OF DEATH, IF DECEASED

FIRST NAME    MIDDLE NAME OR INITIAL    LAST NAME    RELATIONSHIP    GENDER
                                                                    O F  O M

DATE OF BIRTH    PLACE OF BIRTH    DATE OF DEATH, IF DECEASED    PLACE OF DEATH, IF DECEASED

[UPDATE]    [MORE INPUT]    [RETURN TO MAIN MENU]    [EXIT]

FAMILY TREE WEB-EXPRESS
AUTOMATIC FAMILY TREE AUTHOR

140

FIRST NAME ☐  MIDDLE NAME / INITIAL ☐  LAST NAME ☐  PROBABLE RELATIONSHIP ☐

DATE OF BIRTH ☐  PLACE OF BIRTH ☐  DATE OF DEATH, IF DECEASED ☐  PLACE OF DEATH, IF DECEASED ☐

ACCURACY RATING ☐  [CLICK HERE FOR MORE INFORMATION ABOUT THIS INDIVIDUAL]  ACCEPT? ○ Y ○ N

FIRST NAME ☐  MIDDLE NAME / INITIAL ☐  LAST NAME ☐  PROBABLE RELATIONSHIP ☐

DATE OF BIRTH ☐  PLACE OF BIRTH ☐  DATE OF DEATH, IF DECEASED ☐  PLACE OF DEATH, IF DECEASED ☐

ACCURACY RATING ☐  [CLICK HERE FOR MORE INFORMATION ABOUT THIS INDIVIDUAL]  ACCEPT? ○ Y ○ N

FIRST NAME ☐  MIDDLE NAME / INITIAL ☐  LAST NAME ☐  PROBABLE RELATIONSHIP ☐

DATE OF BIRTH ☐  PLACE OF BIRTH ☐  DATE OF DEATH, IF DECEASED ☐  PLACE OF DEATH, IF DECEASED ☐

ACCURACY RATING ☐  [CLICK HERE FOR MORE INFORMATION ABOUT THIS INDIVIDUAL]  ACCEPT? ○ Y ○ N

[UPDATE]  [MORE INPUT]  [RETURN TO MAIN MENU]  [EXIT]

METHOD AND SYSTEM FOR BUILDING A FAMILY TREE

FIELD OF THE INVENTION

The present invention relates to a method system for automatically building and/or accessing a family tree.

BACKGROUND OF THE INVENTION

Today when an individual wishes to construct his or her family tree he or she will often talk to as many relatives as they can reasonably contact and get their best recollections of the family relationships. From this information, they will construct the best possible family tree from the available information. A family tree constructed in this manner may often be incomplete since it relies on the memories of those currently living. As such, it may only cover a few past generations unless a tree had previously been constructed. Alternatively, there are other sources of information including government and church records. The Mormon Church, for example, maintains an extensive database of birth and death records. These sources, however, may be difficult and time-consuming to review and may involve extensive communications to obtain the relevant data. Also, in many cases, an individual may need to know the place of birth or death in order to search the relevant database. Once the relevant information has been obtained, the person will need to construct the family tree, though there is commercial software to do this, such as Family Tree Maker, which is currently available from The Learning Company. Another alternative is to pay a third party provider to construct a family tree. This can be expensive and may also contain inaccuracies. Finally, in all of these cases, the data available for the family tree is likely to only consist of the names, dates and places of birth and death, and relationships of family members. While this data will be sufficient to create a classical family tree, it will lack such information as pictures, news clippings, voice or video clips, music, etc. that could enrich the experience of reviewing the family tree.

Thus, there is a need to provide a simple, effective, and inexpensive way to gather information to construct a family tree and to broadly distribute the final result. Additionally, when such information as pictures, sound clips, etc. are added to the family tree, the final result becomes much more valuable and pleasurable for those reviewing the tree.

The present invention seeks to solve these problems by utilizing a communication network, such as the Internet, to allow people to search a wide variety of servers linked to the network, for information that can be used to construct the family tree.

SUMMARY OF THE INVENTION

In accordance with one aspect of the present invention there is provided a method for gathering information relevant to the creation of a family tree, organizing the information, and displaying it in the form of a family tree, comprising the steps of searching multiple databases through a network and scanning the database for relevant information, reviewing the information according to a set of algorithms for relationships to other individuals entered into the local database and assessing the probability that the newly identified individual is related to the original individual, providing the information, along with the probability assessment to the user for acceptance or rejection and updating the database upon acceptance of the user.

In accordance with another aspect of the present invention there is provided a method for gathering information relevant to the creation of a family tree, organizing the information, and displaying it in the form of a family tree, comprising the steps of searching multiple databases through a network and scanning the database for relevant information, reviewing the information according to a set of algorithms for relationships to other individuals entered into the local database and assessing the probability that the newly identified individual is related to the original individual, providing the information, along with the probability assessment to the user for acceptance or rejection and updating the database upon acceptance of the user.

In accordance with still another aspect of the present invention there is provided method for automatically compiling a family tree, comprising the steps of obtaining specified data about a first individual, obtaining the specified data about a second individual, automatically comparing the specified data for the first and second individuals so as to determine if there exists matching data for establishing a family connection and establishing a link when the family connection is found to exist between the first and second individual.

In accordance with yet still another aspect of the present invention there is provided a software product for automatically compiling a family tree such that when loaded onto a computer it would cause the computer to do the following steps of obtaining specified data about a first individual, obtaining the specified data about a second individual, automatically comparing the specified data for the first and second individuals so as to determine if there exists matching data for establishing a family connection and establishing a link when the family connection is found to exist between the first and second individual.

In accordance with another aspect of the present invention there is provided a computer software product for gathering information relevant to the creation of a family tree such that when loaded on to a computer will cause the computer to do the steps of searching multiple databases through a network and scanning the database for relevant information, reviewing the information according to a set of algorithms for relationships to other individuals entered into the local database and assessing the probability that the newly identified individual is related to the original individual, providing the information, along with the probability assessment to the user for acceptance or rejection and updating the database upon acceptance of the user.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figure 1:
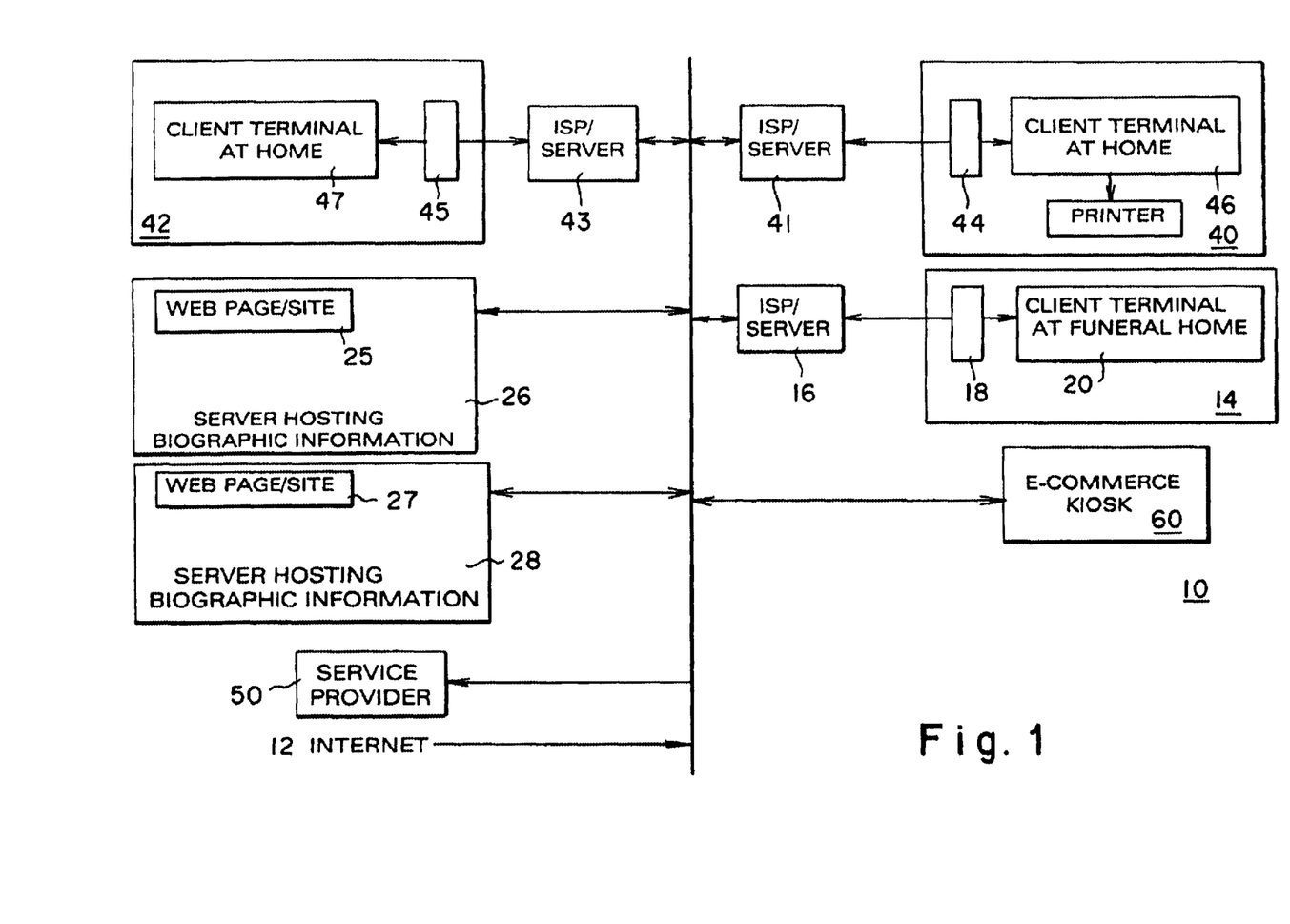
FIG. 1 illustrates a system made in accordance to the present invention for gathering and distributing information useful in constructing a family tree.

Referring to FIG. 1, there is illustrated a system 10 made in accordance to the present invention for gathering and distributing information useful in constructing a family tree. In the embodiment illustrated, system 10 includes a communication network 12 that is freely accessible by individuals. In the particular embodiment illustrated, the communication network 12 is the Internet. However, it can be any other appropriate communication network that may be utilized. System 10 includes a personal computer 44 with a data-entry system 46 located at an individual's home 40. Typically, the data-entry system 46 is a keyboard, but it may include a microphone, digital camera, smart card, computer mouse or other computer data entry device. The computer is connected to the network 12 through an Internet Service Provider 41. Thus, the individual at home may use his or her computer to access information that might be relevant to constructing a family tree and is contained on various web pages/sites 25, 27 located on other servers 26, 28 that are connected to the Internet 12. Similarly, the individual may also be able to use a personal computer 45 which is similarly equipped with a data-entry system 47 and is connected to the network 12 through an Internet Service Provider 43, and is located at the individual's place of employment 42. Also, an individual may use a computer 18 at a funeral home 14, or any other business establishment, to access servers 26, 28 that may contain the relevant information, so long as the computer includes a suitable data entry device 20 and is connected to the Internet 12 through an appropriate Internet Service Provider 16.

Figure 2:
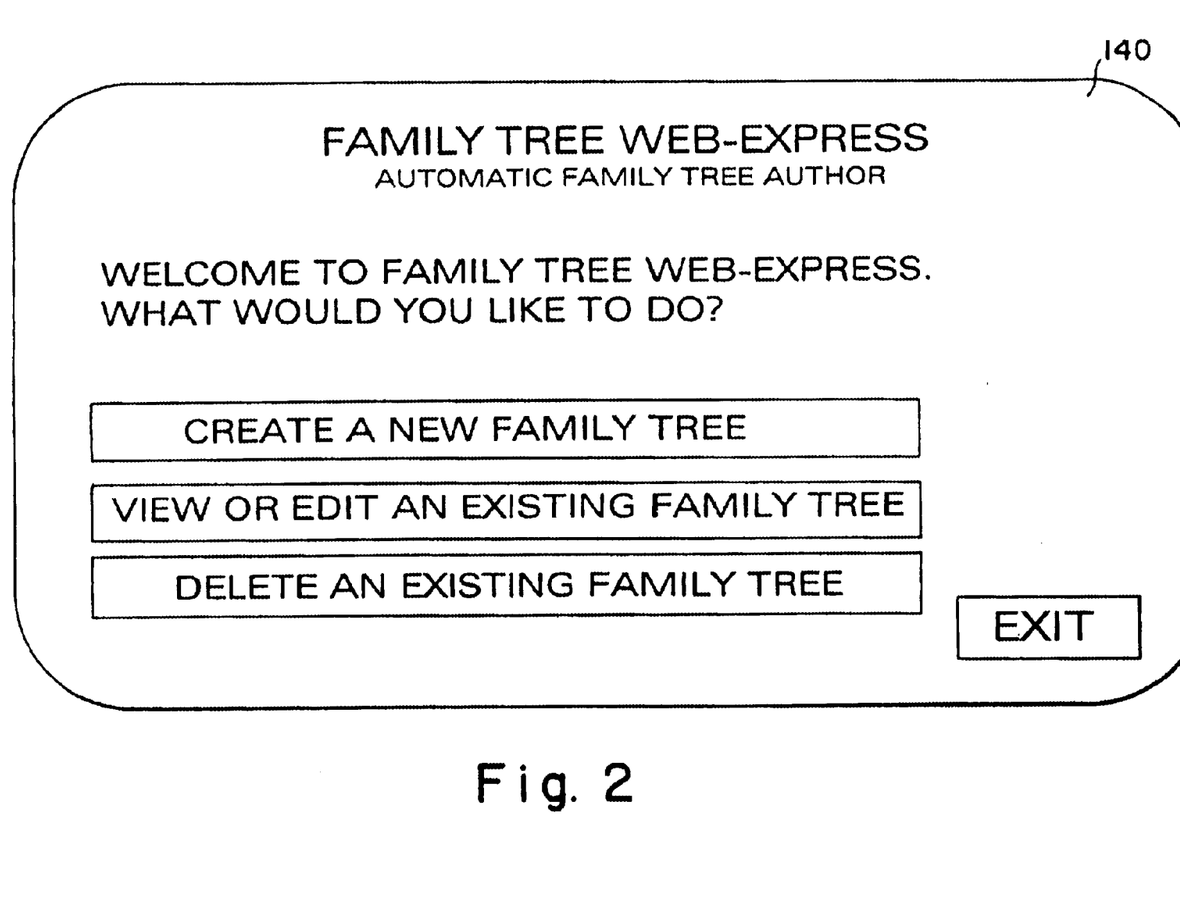
FIG. 2 shows a main menu screen for the family tree software.
Figure 3:
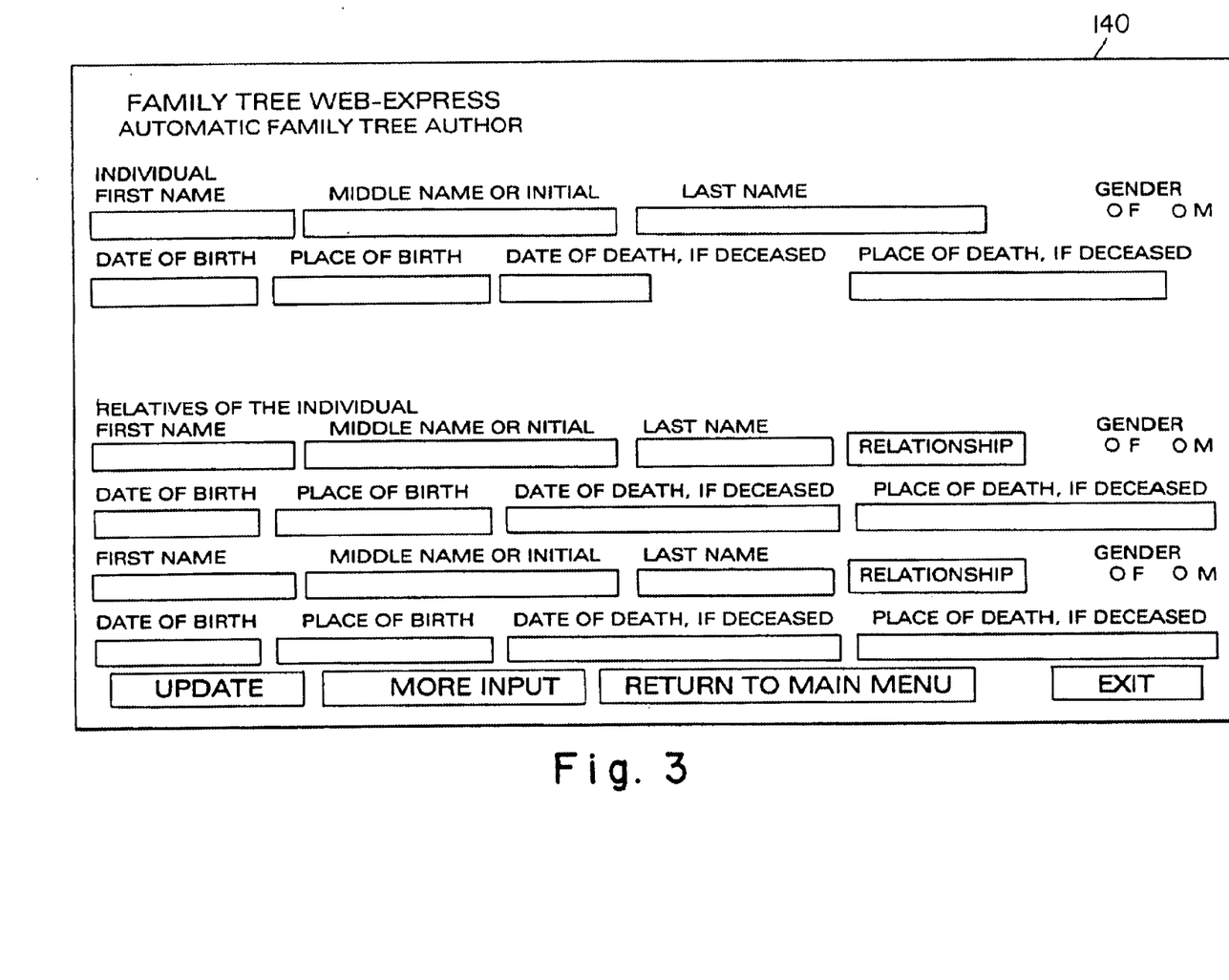
FIG. 3 illustrates a screen for entering family tree information made in accordance with the present invention.
Figure 4:
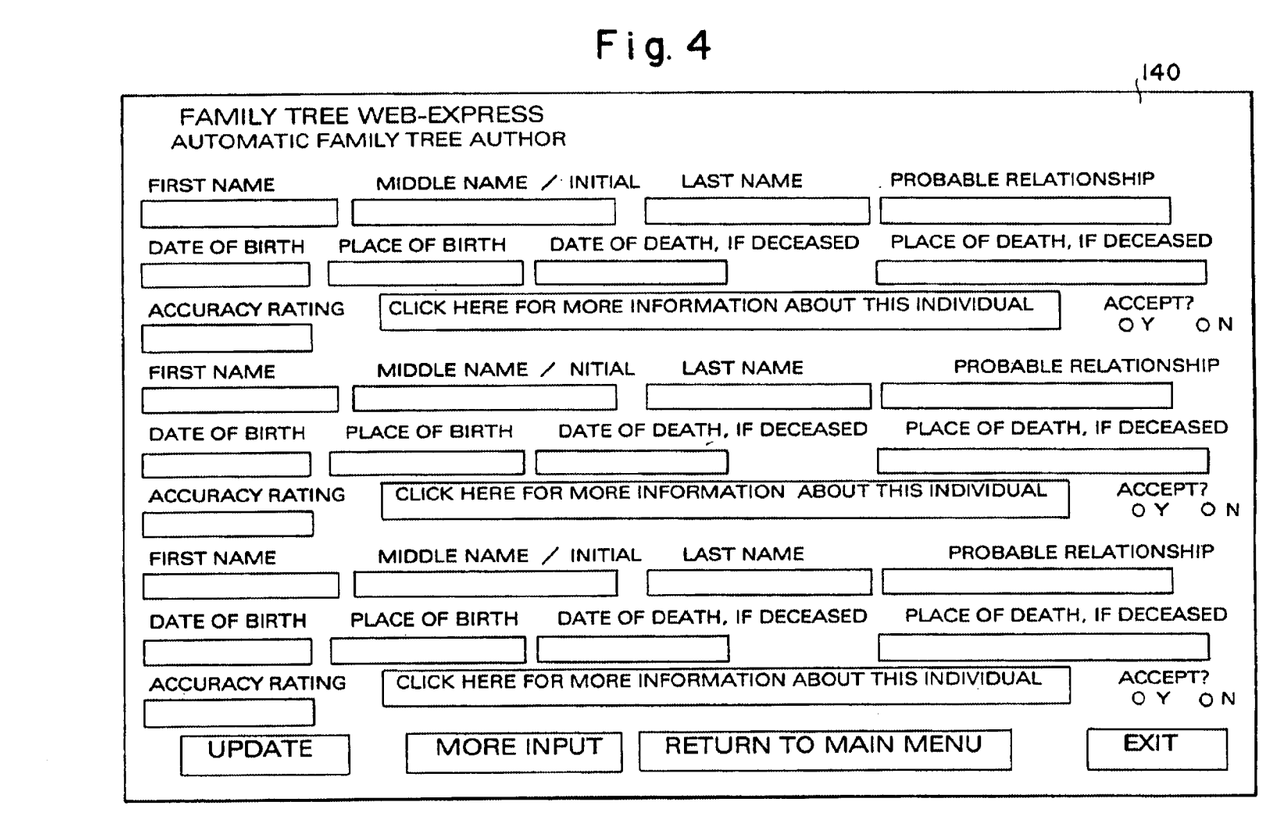
FIG. 4 illustrates a screen wherein the software returns information to the user regarding possible family members.

In accordance with the present invention, an individual wishing to construct a family tree, hereinafter called the user, first launches software for constructing the family tree on his personal computer 44, located at home. For the purposes of this description, it will be assumed that the entire transaction occurs from the individual's home, although, the invention covers the operation of the system and the software from any location or any type computer or other access device. Once the software has been launched, the user selects the input display screen 140, shown in FIGS. 2, 3 and 4 and decides what action he would like to take. The options include creating a new family tree, viewing or editing an existing family tree, or deleting an existing family tree, selection icons 142, 144, and 146, respectively. When the individual chooses to create a new family tree, the software switches to a display screen 150 as illustrated in FIG. 3. At that point, the user begins to enter as much information he or she knows about the individual whose family tree he wishes to create or whom he'd like to include on a family tree focused on another individual. This information could include such items as the person's name, relationship to the individual, date and place of birth, date and place of death (if deceased), places the person has lived and the dates he or she lived there, names of parents, or any other information useful in identifying the individual. The individual can enter data on as many individuals as desired. The accuracy of the family tree that is created will increase as more information is entered. Once the information has been entered, the user connects to the Internet 12 and then selects the "Search" button 160 on the main menu 170 of the software as shown in FIG. 2. Typically selecting of the desired button occurs through the use of a computer mouse, however any appropriate technique may be use. Triggered by the search button 160, the software triggers a search engine on a remote server/website and begins to search the Internet 12 for names of people whose identifier information matches or closely matches that of the person about whom the family tree is being made. This information may be contained on any of a number of servers 26, 28 connected to the Internet 12. After searching the Internet 12 and finding all the relevant information, the search engine will return a list of candidate names, i.e. those likely to be related to the person in question, along with a probability assessment that the identified person is indeed related to the person, as shown in FIG. 4. It will also establish its "best guess" of the relationship of the newly identified persons to the individual. An algorithm determines the assigned probability such that the probability increases proportionately to the number of data item matches, and is therefore dependent upon the amount of information entered. The user then reviews the list and selects a box next to each of the persons that he/she believes is related to the individual. The user also confirms or corrects the relationship of the newly identified persons to the individual. Finally, the user can enter additional information that he or she may know about the newly identified person. The user, by selecting the "Update" button 172, relaunches the search engine so that it can now go out to the World Wide Web to find information about those people who may related to the newly identified persons and returns that information to the user. The user cycles through this process as many times as he/she wants to depending on how many generations he/she wants to include on the family tree. Once the family tree has been created, the user has a number of options including: saving the family tree as a file on a hard drive, floppy disk, or other storage media, e-mailing the file containing the family tree to another person, or printing the family tree in any desired format on a personal home printer 49. The user can also forward the file containing the family tree to a third party service provider 50, such as Print @ Kodak, for production of high quality prints, compact disks, or any other type of rendering of the family tree that the user might request. It is also possible to print, at home or through a third party provider, any or all of the various images that may be contained in the family tree. For example, in building the family tree, an individual may learn of a distant cousin that was previously unknown to them. As the system and the various worldwide created the tree, someone may have input an image of that cousin. The system enables the individual to obtain a print, CD, or other rendering of that image.

Figure 5:
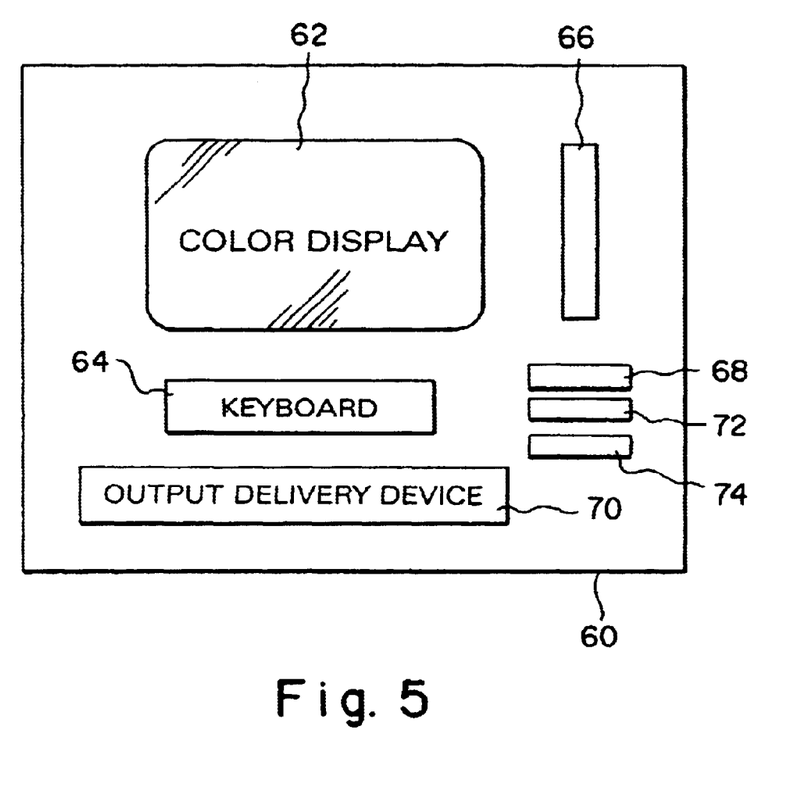
FIG. 5 illustrates in a Kiosk, another embodiment of the present invention.

Referring now to FIG. 5, there is illustrated another embodiment of the present invention that utilizes a Kiosk 60. The Kiosk 60 contains software allowing a family member, friend, or other person to view the family tree and/or enter information at a third party location, such as a funeral home, a hospital, or church. In the case of the funeral home 14, visitors may be asked to enter information about themselves or other relatives of the deceased, to begin the process of creating the database necessary to create the family tree. The Kiosk 60 can be configured to prepare a print or a CD (not shown) of the family tree and accept a credit card for payment. The Kiosk 60 is provided with appropriate input controls allowing access to the Internet 12 and to the web 25. The Kiosk 60 also includes a display screen 62, a data entry mechanism, such as a keyboard 64 for data entry by the user, and a card slot 66 having an associated reader for reading of the information on the access card 22. This Kiosk 60 can be located at a remote site placed at a business establishment such as the funeral home 14. However, it is to be understood that the Kiosk 60 can be of any commercial type and placed in any appropriate location. The Kiosk 60 having an appropriate payment mechanism 68 is capable of receiving payments for any goods and/or services. In the particular embodiment illustrated, the Kiosk 60, as shown in FIG. 5, has the capability of providing copies of text and/or images to the user. In another option, the Kiosk 60 is equipped with the appropriate devices for producing CDs, tapes, and other recordings on which images, text, sound and other data are contained. In such cases an output delivery device 70 is provided for the delivering of the requested product to the user of the Kiosk 60. Of course other input or output devices 72, 74 may be provided as desired.

In addition to the data shown on the screen diagram in FIG. 3, users may also enter other types of information which may include pictures, sound clips, video clips, or any other type of information that would be desirable to view with the family tree.

The present invention also provides for the data about an individual or family to be partitioned into a number of different sections of a database. These can include separate sections for verified and non-verified data, verified data being that can be substantiated through official records, or other documentation. Such other documentation may include, for example, images, audio clips, or fingerprints that may be confirmed to be a specific person through the use of image comparison algorithms, audio waveform analysis, or fingerprint matching algorithms, respectively. Additionally, access to the various sections of a database may be restricted. For example, a user might choose to provide unlimited access to information about deceased individuals, while restricting access to information about living individuals. Another way the user can partition the data is to keep restricted information on his own personal computer, while storing unrestricted data on a server connected to the Internet.

The present invention also provides for a number of ways to pay for and otherwise derive value from the family tree application. These may include an annual maintenance fee paid to the provider of the service, a subscription model wherein the user receives a number of prints or CD's in return for payment of the subscription, or banner advertising. There could also be embodiments wherein a third party, e.g. a funeral home, camera store or other business establishment participates in the income generated by the system in return for Kiosk placement.

To better understand the present invention, a brief description of this operation will now be discussed in greater detail.

Figure 6:
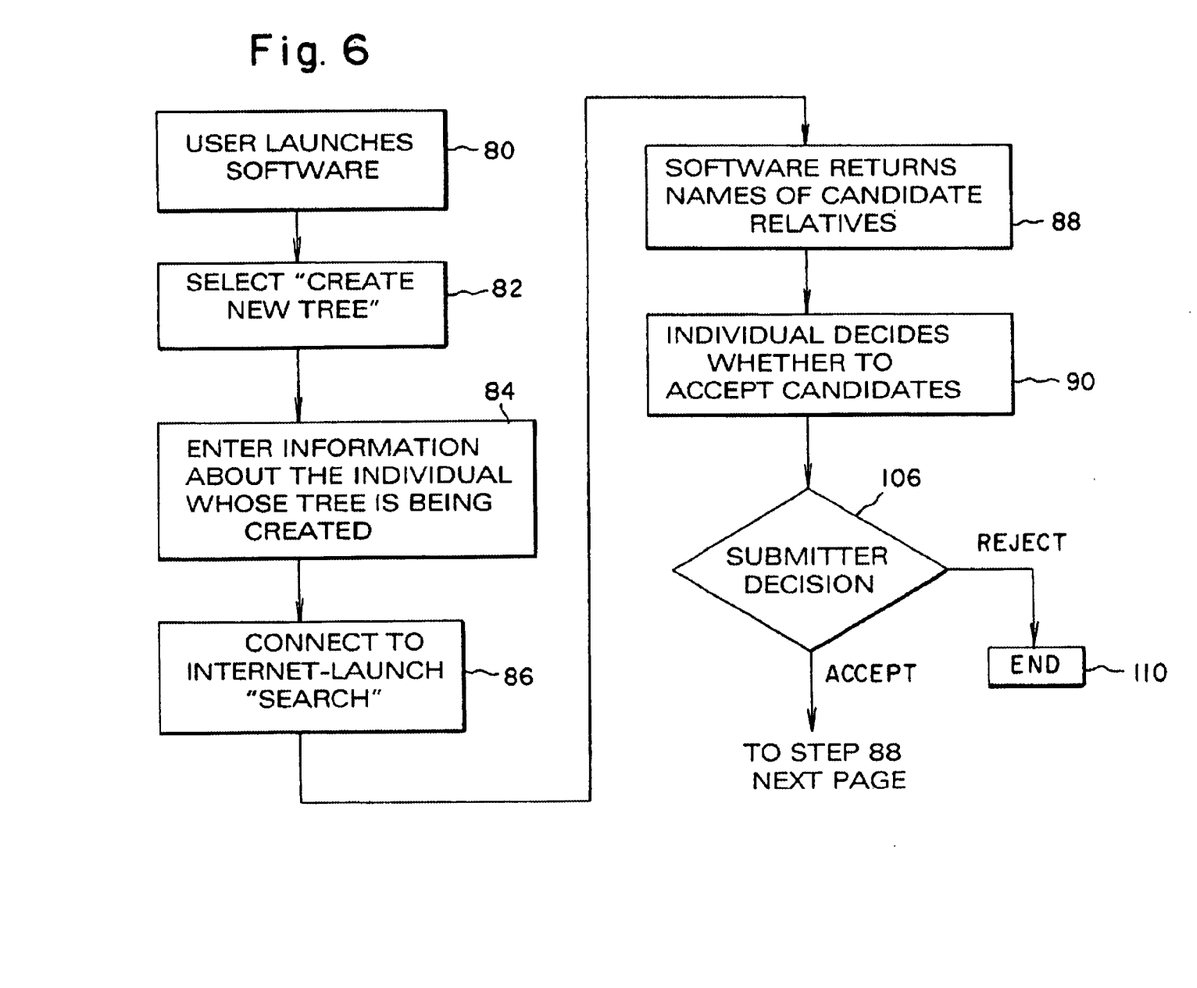
FIG. 6 is a flow chart describing one method of operation of the present invention.
Figure 7:
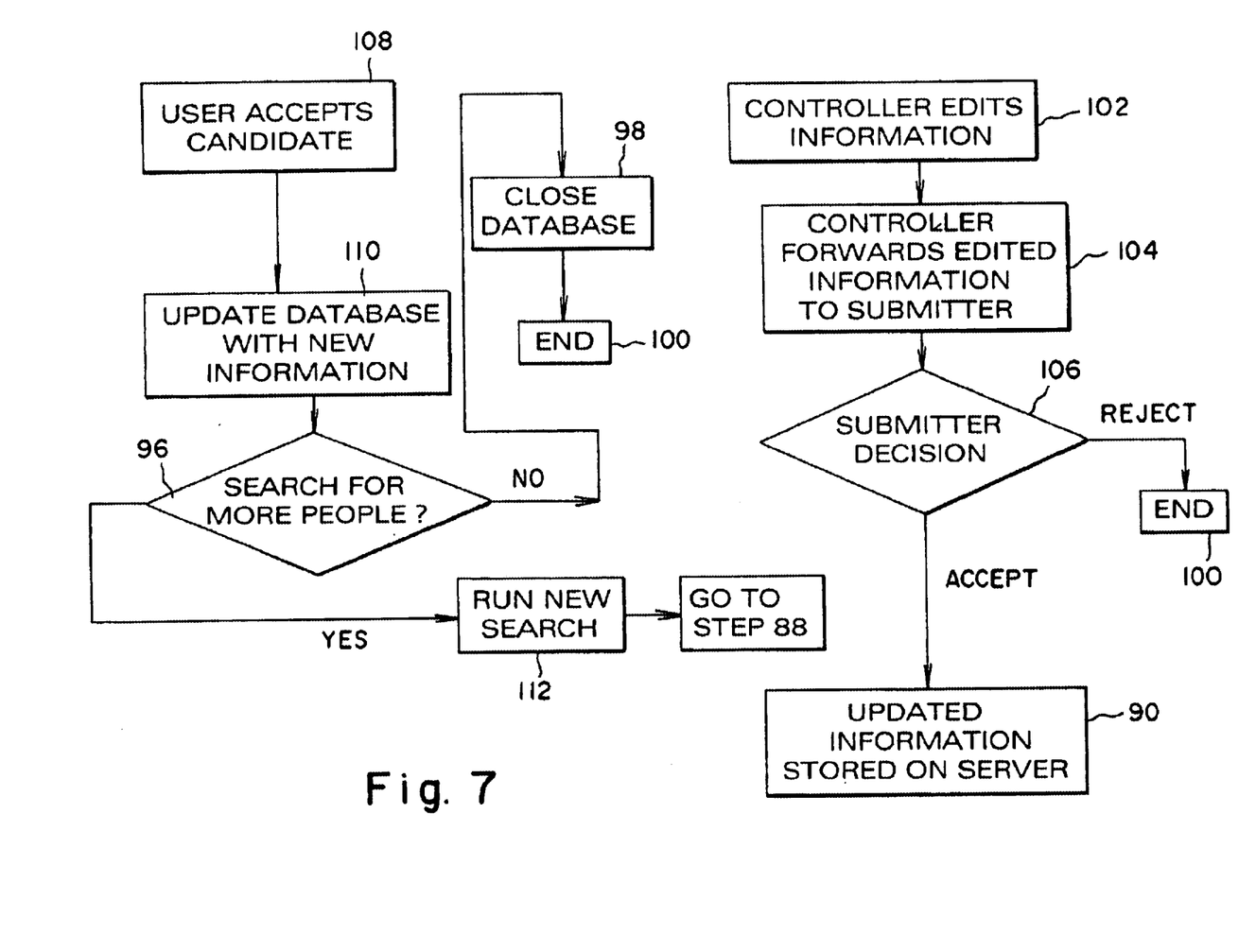
FIG. 7 is a flow chart describing one method of operation of the present invention.

Referring to FIG. 6, a flow chart describes one method of operation of the present invention. An individual wishing to construct a family tree first launches the software, step 80 on a personal computer. Once the software has been launched and the main page appears, the user selects "Create a new family tree", step 82. This causes the software to bring forth a set of screens onto which the user may enter information about the individual whose tree is being created, step 84. Once the user has entered as much information about the individual as is available, he or she clicks on the "Search" button, step 86. This causes the software to connect to the Internet and, through the use of its search engine, look for other references to the individual and his or her family. The software will return information step 88 about people who, according to the algorithms in the software, are likely to be related to the individual. At step 90 the individual is presented with the opportunity to accept the candidate relatives. The user then can decide step 106 whether or not to accept the recommendations of the software. If the user decides to accept step 108 the software will update the database step 112 with the new information linking each of the accepted candidates to the individual in the family tree. If the user opts to reject the proposed candidates step 110, the database will not be updated and the process will end. This process continues until the user has accepted or rejected all of the recently returned candidates. Once the user has made decisions on all the recently proposed candidates, he or she has the option step 96 of rerunning the search step 114 based on the newly added information. This process continues until the user decides to stop at which point the database is closed step 98 and the session ends step 100.

Once the family tree has been created, the software that maintains the family tree can set up to review on a periodic basis, various data bases so that related individuals can be automatically added to the tree and provide this information to all of the living individuals on the family tree or designated individuals. This may be done for a fee paid at the time of creation of the family tree or for a fee upon acceptance of the new information to be added to the existing family tree.

It is possible, under the present invention, for an individual to choose only to view a listing of his/her ancestors without actually creating a family tree. Similarly, it is possible to view the family tree without printing it.

It is to be understood that various modifications and changes may be made without departing from the present invention, the present invention being defined by the following claims.

| PARTS LIST | |
|---|---|
| 10 | System |
| 12 | Network/Internet |
| 14 | Funeral home |
| 16 | ISP/server |
| 18 | Personal computer/server |
| 20 | Data entry device |
| 25 | Web pages/sites |
| 26 | Server |
| 27 | Web pages/sites |
| 28 | Server |
| 40 | Home |
| 41 | Internet service providers |
| 44 | Personal computer/server |
| 45 | Personal computer/server |
| 46 | Data entry system |
| 47 | Data entry system |
| 49 | Personal printer |
| 50 | Third party service provider |
| 60 | Kiosk |
| 62 | display screen |
| 64 | keyboard |
| 66 | card slot |
| 68 | payment mechanism |
| 70 | output delivery device |
| 72 | input/output devices |
| 74 | input/output devices |
| 80 | Step |
| 82 | Step |
| 84 | Step |
| 86 | Step |
| 88 | Step |
| 90 | Step |
| 96 | Step |
| 98 | Step |
| 100 | Step |

-continued

PARTS LIST

| | |
|---|---|
| 106 | Step |
| 108 | Step |
| 110 | Step |
| 112 | Step |
| 114 | Step |
| 140 | Input display screen |
| 142 | Icon |
| 144 | Icon |
| 146 | Icon |
| 150 | Display screen |
| 160 | Button |
| 170 | Main menu |
| 172 | Button |

What is claimed is:

1. A method for gathering information on a database on a computer at a first location relevant to the creation of a family tree with respect to at least one identified individual, organizing the information, and displaying it in the form of a family tree, comprising the steps of:

using a software program to search multiple databases unrelated to said database on said computer at said first location over a communication network on said computer at said first location for obtaining relevant information regarding at least one candidate for said family tree;

executing a set of algorithms by said software program for obtaining probability assessment that the at least one candidate is related to the at least one identified individual;

providing said information, along with the probability assessment to the user for acceptance or rejection; and updating the family tree upon acceptance by the user.

2. A method according to claim 1 wherein said network is the internet.

3. A method according to claim 1 wherein said algorithms are contained in software that is loaded onto a personal computer.

4. A method according to claim 1 wherein said algorithms are contained in software that is loaded onto Kiosk.

5. A method according to claim 1 wherein said algorithms are contained in software that is contained on a third party server and is accessed by the user via a connection to a network.

6. A method according to claim 4 wherein said network is the Internet.

7. A method according to claim 1 wherein the data is rendered into a family tree format and printed on a printer connected to a personal computer.

8. A method according to claim 7 wherein the printing is done on a Kiosk.

9. A method according to claim 7 wherein the printing is done by a third party service provider.

10. A method according to claim 1 wherein the data is stored on a Compact Disk.

11. A method according to claim 1 wherein the data is input at a third party location.

12. A method according to claim 1 wherein the data is partitioned into sections.

13. A method according to claim 12 wherein different levels of accessibility are provided for each section.

14. A method according to claim 1 wherein the individuals are related not through family relationships but due to other experiences.

15. A method according to claim 14 wherein said experience is a secondary school or university class.

16. A method according to claim 14 wherein said experience is related to military service.

17. A method according to claim 1 wherein said data may comprise any one of the following: text, image, or sound.

18. A method according to claim 1 wherein other individuals may add or edit information contained in the database.

19. A method according to claim 18 wherein the user has the option to approve or not approve said additions or edits.

20. A method for gathering information on a database on a computer at a first location relevant to the creation of a family tree with respect to at least one identified individual, organizing the information, and displaying it in the form of a family tree, comprising the steps of:

using a software program to search multiple databases unrelated to said database on said computer at said first location over a communication network on said computer at said first location for obtaining relevant information regarding at least one candidate for said family tree;

executing a set of algorithms by said software program for obtaining probability assessment that the at least one candidate is related to the at least one identified individual;

providing said information, along with the probability assessment to the user for acceptance or rejection; and updating the family tree upon acceptance by the user wherein the data comprising the family tree is contained on a web page hosted on a server connected to a network.

21. A method according to claim 20 wherein the data comprising the family tree is contained in a web page hosted on a server connected to a network.

22. A method according to claim 20 wherein said network is the internet.

23. A method according to claim 20 wherein said web page includes a template for setting forth the manner and structure of the web page/site.

24. A method according to claim 20 wherein said web page is hosted by a business establishment having a plurality of such web pages.

25. A method according to claim 20 wherein said electronic data base is accessed by a Kiosk.

26. A method according to claim 20 wherein said electronic data base is accessed by personal computer at a location remote from said electronic data base.

27. A computer software product for gathering information on a database on a computer at a first location relevant to the creation of a family tree with respect to at least one identified individual such that when loaded onto a computer will cause the computer to go through the steps of:

using a software program to search multiple databases unrelated to said database on said computer at said first location over a communication network on said computer at said first location for obtaining relevant information regarding at least one candidate for said family tree;

executing a set of algorithms by said software program for obtaining probability assessment that the at least one candidate is related to the at least one identified individual;

providing said information, along with the probability assessment to the user for acceptance or rejection; and updating the family tree upon acceptance by the user.

* * * * *